United States Patent [19]
Cote et al.

[11] Patent Number: 6,125,347
[45] Date of Patent: *Sep. 26, 2000

[54] SYSTEM FOR CONTROLLING MULTIPLE USER APPLICATION PROGRAMS BY SPOKEN INPUT

[75] Inventors: William F. Cote, Billerica; Raymond C. Kurzweil, Newton, both of Mass.; Edmund R. MacKenty, Pipersville, Pa.; Harley M. Rosnow, Cambridge, Mass.

[73] Assignee: L&H Applications USA, Inc., Waltham, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 08/128,990

[22] Filed: Sep. 29, 1993

[51] Int. Cl.[7] .............................. G10L 15/00; G10L 21/06
[52] U.S. Cl. ......................... 704/275; 704/270; 345/333
[58] Field of Search ..................................... 395/2.4, 2.44, 395/2.6, 2.79, 2.84, 2.85; 381/43, 44, 48; 345/333

[56] References Cited

U.S. PATENT DOCUMENTS

| | | | |
|---|---|---|---|
| 4,829,576 | 5/1989 | Porter | 395/2.87 |
| 5,101,375 | 3/1992 | Goldhor | 364/419.1 |
| 5,231,670 | 7/1993 | Goldhor et al. | 395/2 |
| 5,329,609 | 7/1994 | Sanada et al. | 395/2.85 |

OTHER PUBLICATIONS

C. Schmandt et. al, "Augmenting a Window System With Speech Input," *Computer,* Aug. 1990, 23(8):50–56.
"Integrated Audio–Graphics User Interface," *IBM Technical Disclosure Bulletin,* Apr. 1991, 33(11):368–71.

*Primary Examiner*—David R. Hudspeth
*Assistant Examiner*—Susan Wieland
*Attorney, Agent, or Firm*—Bromberg & Sunstein LLP

[57] ABSTRACT

The system described herein facilitates the control, by spoken input, of multiple user application programs running under an operating system providing multi-tasking capability. A speech recognition program runs as one of the multi-tasked programs. The recognition program is operative to provide translation, either text or program commands, of spoken words in accordance with a translation table. Each of the other user application programs which is to be controlled is provided with a respective translation table section. In accordance with the invention, the recognition program includes means for creating a database for each of the other user application programs which is run and stores, in the respective database, a record reflecting each translation which is sent to a running one of the other application programs. These records identify the speech event which was translated and also identifies alternate possible translations of the speech event. Using the databases, the user can undo the effect of a previously sent translation, select an alternate translation and perform other editing tasks.

6 Claims, 13 Drawing Sheets

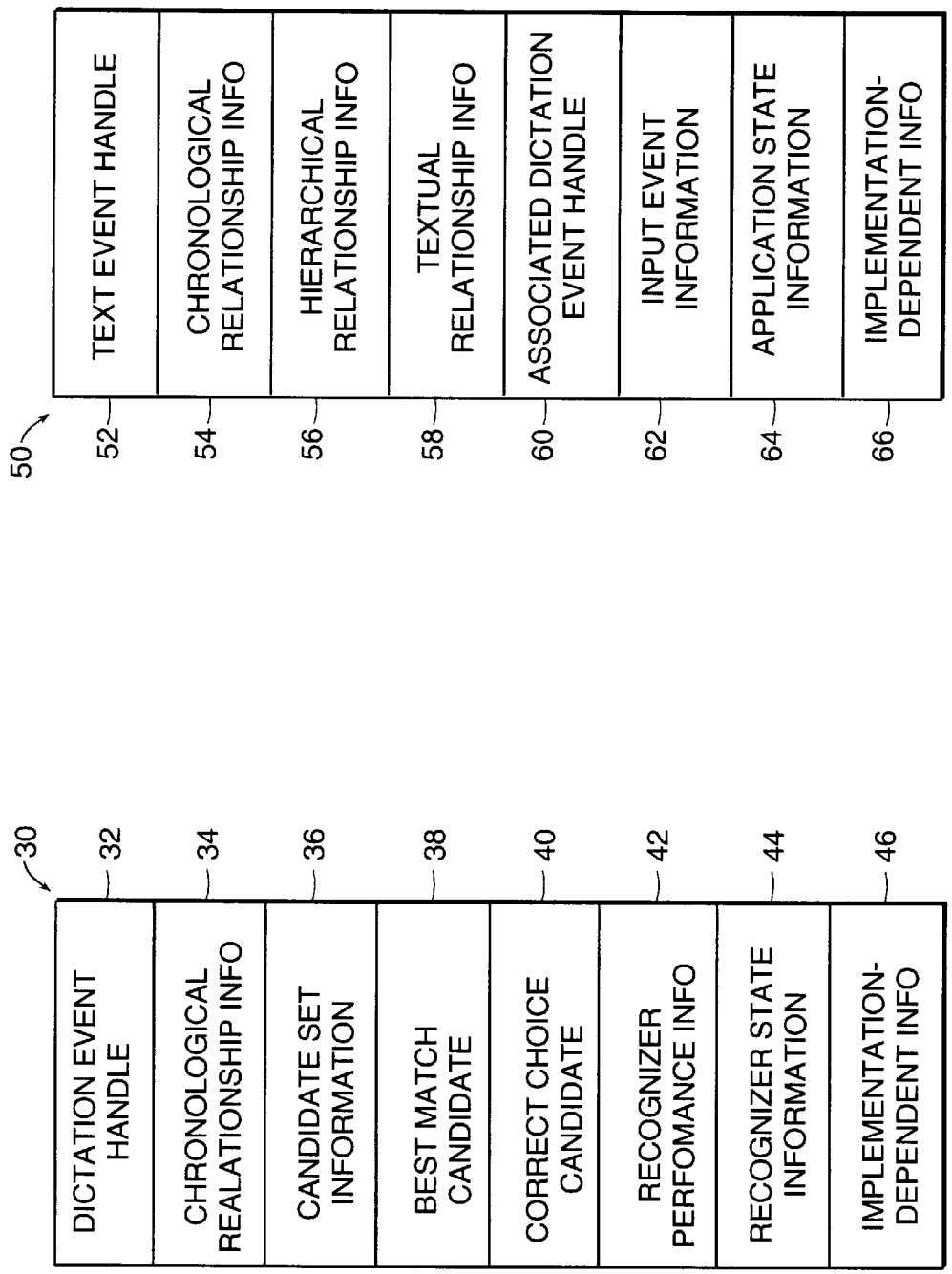

ND USER APPLICATION PROGRAMS BY
SPOKEN INPUT

APPENDIX

The disclosure in this case includes a computer program listing comprising Appendix, pages 49 to 119. The listing is being initially submitted in printed form.

BACKGROUND OF THE INVENTION

The present invention relates to a speech recognition system and more particularly to a speech recognition system which facilitates the running of multiple user application programs by spoken input.

While operating systems are known which provide a multi-tasking capability thereby allowing a plurality of user application programs to run essentially simultaneously, it has heretofore been difficult to control such applications by voice input even though speech recognition systems capable of translating spoken commands into text strings also existed. As is understood by those skilled in the art, even the best speech recognition programs occasionally produce misrecognitions, i.e. respond with a text string which does not correspond to the intended spoken command. Further, the user himself may misspeak on occasion. In the context of running multiple user application programs, the effect of sending an inappropriate text string to a running one of the other user programs may produce a situation which is difficult to correct. In other words, it may be extremely difficult for the user to back out of the situation created by the misrecognition.

Among the several objects of the present invention may be noted the provision of an improved system for controlling multiple user application programs by spoken input; the provision of such a system which allows a user to undo the effect of a translation previously sent to a user program; the provision of such a system which allows the user to select an alternate translation to replace a previously sent translation; the provision of such a system which is highly reliable and which is of relatively simple and inexpensive implementation. Other objects and features will be in part apparent and in part pointed out hereinafter.

SUMMARY OF THE INVENTION

An important aspect of the present invention is that the speech recognition program which processes spoken input maintains a database for each other user application program which is run. This use of multiple databases allows the speech recognition program to essentially maintain a separate effective "context" for each of the user programs. As each translation of a spoken input is sent to a running one of the other user application programs, the recognition program adds a record to the respective database, which record identifies the translation which was sent; identifies the speech event which was translated; and also identifies alternate possible translations of the speech event. The speech recognition program also includes means for responding to a respective user spoken command to undo the effect of a previously sent translation using the corresponding record in the respective database and also means for responding to a respective user command to send to a designated one of the other user application programs, a selected one of the alternate translations, again using the corresponding record in the respective database.

BRIEF DESCRIPTION OF THE DRAWINGS

FIG. 4 is a diagram of a typical data structure utilized to represent each dictation event created by the system and method of the present invention;

FIG. 5 is a diagram of a data structure used to represent each text event generated in response to a dictation event by the system and method of the present invention;

DESCRIPTION OF THE PREFERRED EMBODIMENT

Figure 1:
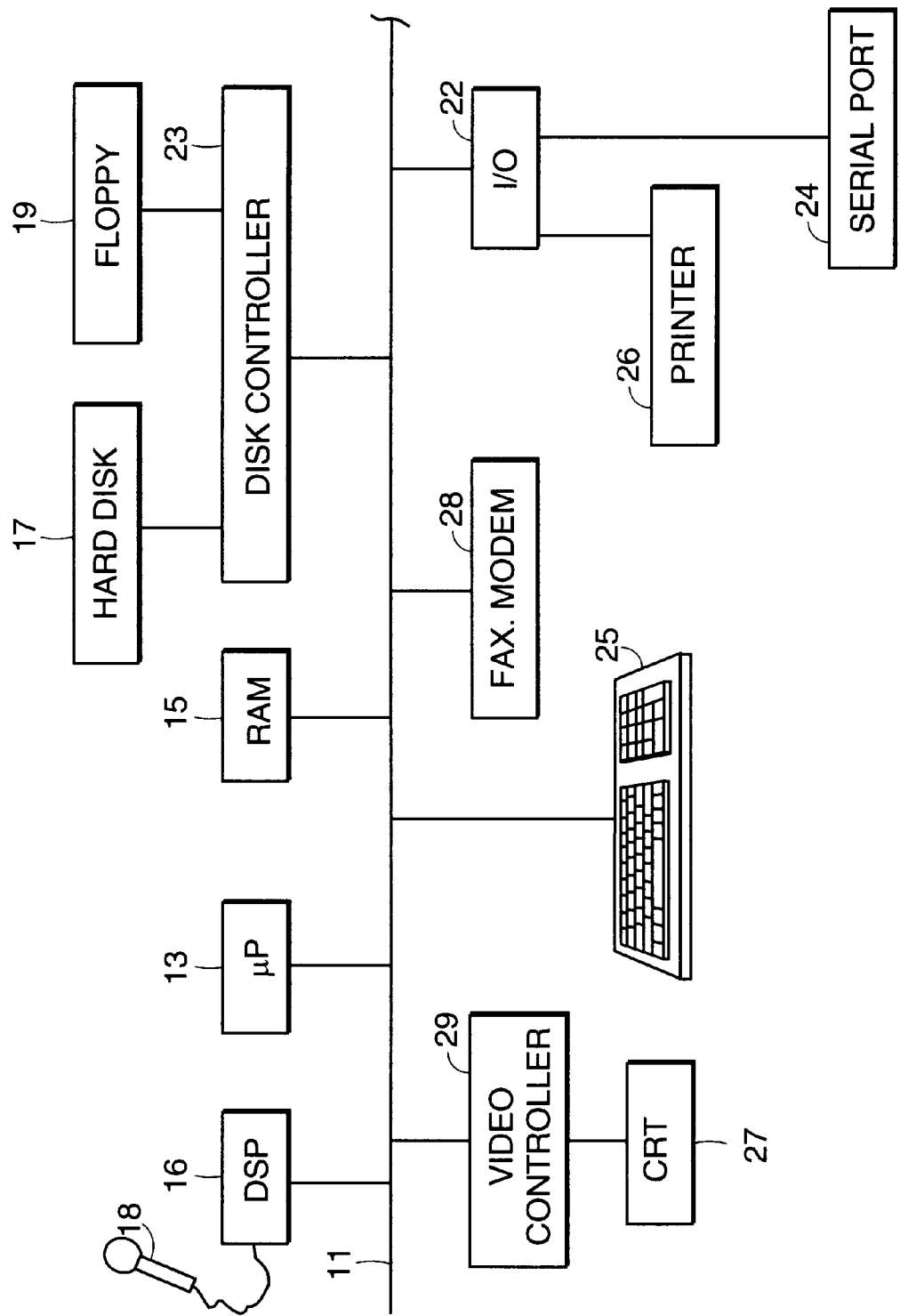
FIG. 1 is a block diagram of computer apparatus for implementing the present invention.

Referring now to FIG. 1, the computer system illustrated there is of the type generally referred to as a personal computer. The computer runs under the MS DOS operating system and is organized around a system bus, designated generally by reference character 11. The system bus may be of the so called EISA type (Extended Industry Standards Association). The computer system utilizes a microprocessor, designated by reference character 13, which may, for example, be an Intel 486 type processor. The system is also provided with an appropriate amount of local or random access memory, e.g., sixteen megabytes, designated by reference character 15. Additional storage capacity is provided by a hard disk 17 and floppy diskette drive 19 which operate in conjunction with a controller 23 which couples them to the system bus.

User input to the computer system is conventionally provided by means of keyboard 25 and feedback to the user is provided by means of a CRT or other video display 27 operating from the bus through a video controller 29. External communications may be provided through an I/O system designated by reference character 22 which supports a serial port 24 and a printer 26. Advantageously, a fax modem may be provided as indicated by reference character 28. This is particularly useful for forwarding structured medical reports as described in co-assigned U.S. Pat. No. 5,168,548.

To facilitate the use of the computer system for speech recognition, a digital signal processor is provided as indicated by reference character 16, typically this processor being configured as an add-in circuit card coupled to the system bus 11. As is understood by those skilled in the art, the digital signal processor takes in analog signals from a microphone, designated by reference character 18, converts those signals to digital form and processes them e.g., by performing a Fast Fourier Transform (FFT), to obtain a series of spectral frames which digitally characterize the speech input at successive points in time.

Figure 2:
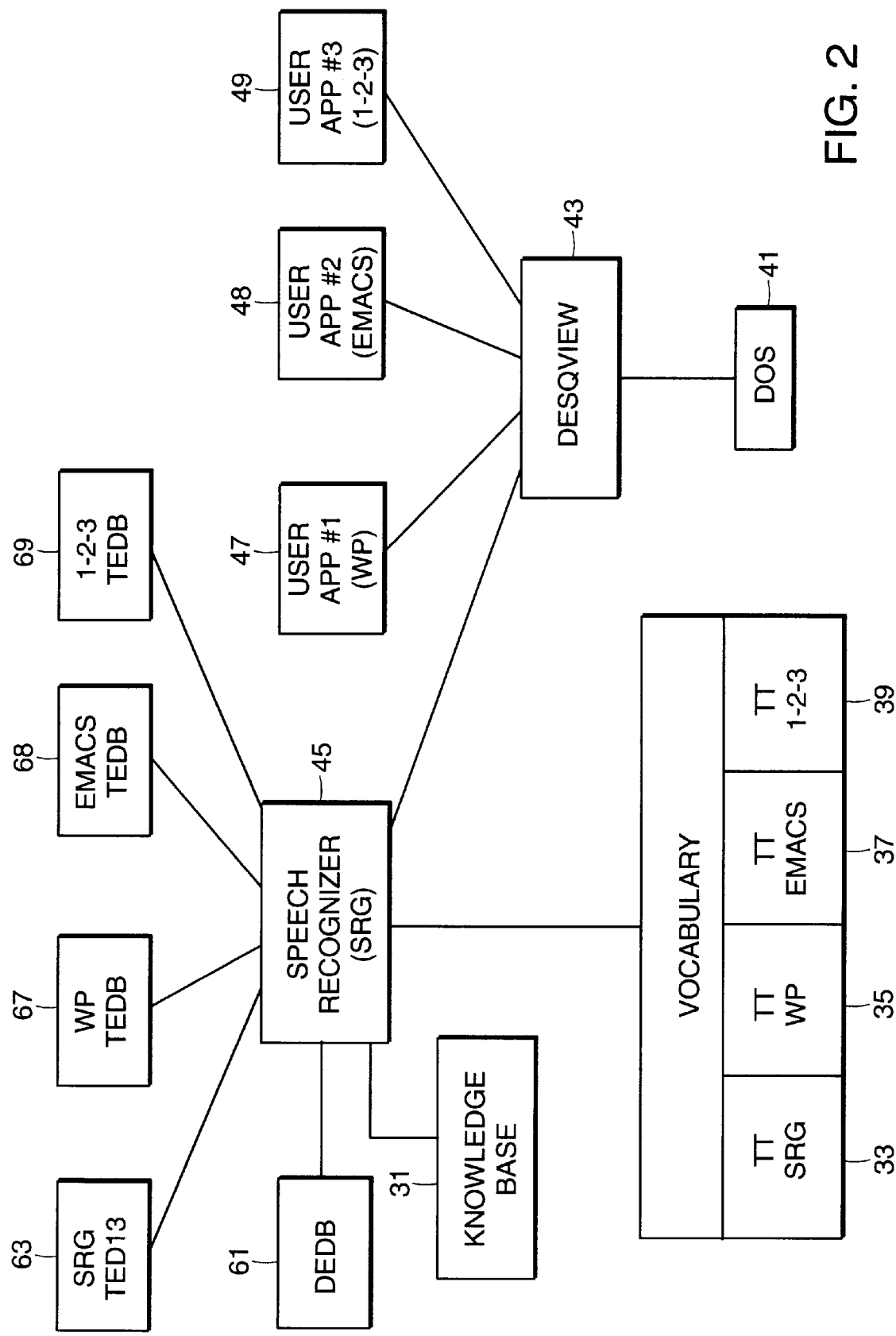
FIG. 2 is a diagram illustrating various software and database components of the system of the present invention.

As indicated previously, the speech recognition program employed in the practice of the present invention works in conjunction with an operating system which provides multi-tasking capability and preferably implements a windowing system which facilitates the direction of user input to the various user application programs which may be running. In the particular embodiment being described by way of example, the operating system means is made up of two components, a basic disk operating system, e.g. DOS Version 5.0 provided by Microsoft Corporation of Belleview, Wash., together with the DesqView multi-tasking and windowing system version 2.4 provided by the Quarterdeck Company of Santa Monica, Calif. In FIG. 2, the basic disk operating system is identified by reference character 41 and the DesqView operating system extension is designated by reference character 43. As is understood by those skilled in the art, the Microsoft Company also provides a multi-tasking extension of its basic operating system sold under the tradename Windows.

As is understood by those skilled in the art, the operating system extended by DesqView allows multiple programs to run essentially simultaneously, i.e. on a time-sharing basis. Under Desqview, a designated one of the programs receives a designated or selectable one of the running programs receives user input. In the embodiment being described, the speech recognition program, designated by reference character 45, is run as the program which principally receives user input. Other user application programs are designated by reference characters 47–49.

The basic speech recognition system is preferably that sold by Kurzweil Applied Intelligence Corporation of Waltham, Mass. and designated as its Structured Report Generator (SRG). As is understood, the basic speech recognition operation involves comparing a received speech segment with a collection of tokens which represent the vocabulary to be recognized. As is also understood, accuracy of recognition can be improved by limiting the active vocabulary to those words which can validly be accepted by the active user application program at any given point in time. Accordingly, the total vocabulary is preferably divided up into sections or word lists with at least one section corresponding to each of the other user programs 47–49. The vocabulary sections for the different multi-tasked programs together with their respective collections of translations are conveniently referred to herein also as translation tables (TT) and are designated by reference characters 33, 35, 37 and 39. Likewise, it should further be understood that the translation tables may be further subdivided so that only a portion of each translation table is utilized at any given moment thereby to further increase recognition accuracy. Further, the translation table for the Structured Report Generator may include a section or portion which can be shared by all the multi-tasked programs. For example, the words comprising the military spoken alphabet (Alpha, Bravo, etc.) may be used for spelling out words which are not in the particular vocabulary associated with a given user application program. The translation table for the Structured Report Generator also includes the various commands, as described hereinafter, which can control the operation of the speech recognizer and effect certain editing operations.

The Structured Report Generator product utilizes a collection of text forms which allows a user to construct a report. This collection is referred to as a Knowledge Base and is identified by reference character 31. The forms contain information which the Structured Report Generator program uses to select the active sections of the vocabulary at any given point in the forms. For facilitating the operation of the present invention, the Knowledge Base incorporates a form corresponding to each other user application.

As is typical, the recognizer program provides not only an identification of the best match but also, in the case of text translations, provides a listing of alternate possible matches which are likely to be the correct word if the correct word is not the first choice. A text string corresponding to a recognized text word is then generated and sent to the user application program.

For facilitating editing, the basic Structured Report Generator maintains a database comprising two parts, a dictation event database 61 and a text event database 63. A text event database is also sometimes referred to as a Structured Text Manager (STM) buffer. The details of these database data structures are described in co-assigned U.S. Pat. No. 5,231,670 entitled Voice Controlled Systems And Method For Generating Text From A Voice Input. The Structured Report Generator also incorporates a capitalization and punctuation facility as described in co-assigned U.S. Pat. No. 5,101,375 and entitled Method and Apparatus For Providing Binding And Capitalization In Structured Report Generation. The disclosures of U.S. Pat. Nos. 5,231,670 and 5,101,375 are incorporated herein by reference.

Other user application programs which are to run simultaneously with and be controlled by the recognition program 45 are indicated by reference characters 47–49 as indicated previously. One of these programs may, for example, be a word processing program such as WordPerfect, as designated by reference character 47. Another program may be a programming editor such as the well known EMACS program, designated by reference character 48, and a third program may be a spreadsheet program such as the well known LOTUS 1–2–3, designated by reference character 49.

In accordance with the present invention, the speech recognition program 45 is extended or expanded so that it interacts with DesqView and, for each user application program which is initiated or started subsequent to the recognition program, a respective additional text event database is created. These additional text event databases are indicated by reference characters 67–69. A text event database associated with a given one of the other user application programs is shut down when the application is stopped. In the embodiment illustrated, the several text event databases share or work in conjunction with the single dictation event database 61. However, it should be understood that respective dictation event databases could also be employed.

Figure 3:
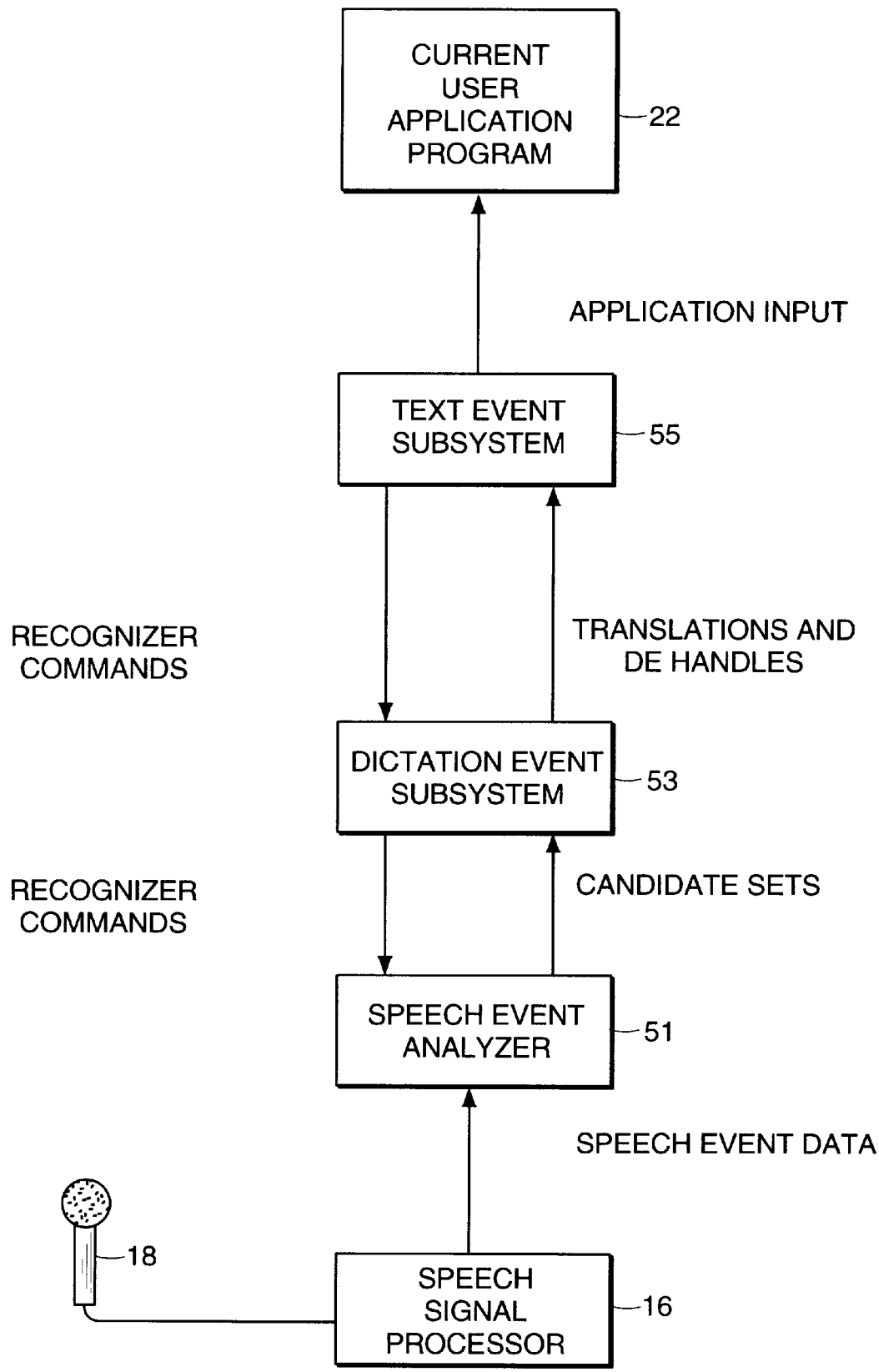
FIG. 3 is a diagram illustrating data flow in the operation of the present invention.

The organization of the speech recognition program itself is illustrated in greater detail in FIG. 3. As indicated previously, acoustic signals received by microphone 18 are converted to digital values and are processed to obtain spectral frames. These are transmitted to a speech event analyzer 51.

The speech event analyzer 51 generates a list or set of possible candidates that represent the voice input processed by the speech signal processor 16. The speech event analyzer 51 transmits the candidate sets to a dictation event subsystem 53. The dictation event subsystem 53 analyzes the candidate sets and chooses the "BEST MATCH", i.e. the candidate with the highest degree of similarity. This candidate is then considered the correct translation, and the dictation event subsystem forwards the translation to text event subsystem 55 which in turn inputs the translated text to a user application. During the execution of the application, text can be displayed on output display device such as CRT 27.

The recognition candidates that are included in the candidate sets transmitted from the speech event analyzer 51 to the dictation event subsystem 53 are vocabulary items similar to the detected speech event. The entire set includes all known vocabulary items which are sufficiently similar to the detected speech event that the speech event analyzer 51 decides there is an appreciable possibility that the speech event was an instance of the vocabulary item. Each candidate includes an associated recognition score which indicates the likelihood that the speech event is an instance of that candidate.

The translation input to the application when a particular candidate is chosen as best match generally represents the spelling of that particular candidate word or phrase. As will be described below, the translation may also be any other legal input into a particular application, and the translation may in fact be used to control the application by voice. The translation may also include input to the recognizer whereby the operation of the recognizer can be controlled and its state changed.

As mentioned above, a dictation event describes the operation of system of the present invention at the input stage of the system. A dictation event record is a formal data object that describes the speech event, and the speech event is an occurrence in the speech signal of an event interpreted as a word or phrase by the recognizer. For each such speech event, the recognizer stores useful information in a respective dictation event database and provides techniques (commands, subroutine calls, macros, etc.) by which certain specified operations may be performed on the dictation event database. Before discussing these various operations the structure of each individual data element in each record of the dictation event database will be described.

Referring now to FIG. 4, there is shown a dictation event record 30 of the dictation event database for a single dictation event. Each record includes a dictation event handle 32 which is generally an address in the database where this record is stored. The chronological relationship information element 34 includes addresses or pointers to other dictation event records created immediately before and immediately after the current dictation event record.

The candidate set information element 36 contains information relating to each of the potential recognition candidates that is chosen by the speech event analyzer 51, and in one embodiment this information is a list of hash codes representing each one of the candidates. Element 36 of the dictation event record 30 will also frequently include the recognition scores representing the probability that each candidate is the best match for the speech event data transmitted to the speech event analyzer 16. The best match candidate element 38 indicates the candidate chosen as the best match and in one embodiment this element is an index into the candidate set contained in element 36. In other words, element 38 points to the best match candidate in the candidate set. The correct choice element 40 of the dictation event record is also an index into the candidate set that points to the correctly translated speech pattern. Of course, this record may point to the same candidate as the best match candidate element 38.

The recognizer performance information element 42 is a rather large substructure of the dictation event record 30. This element 42 receives data from various modules in the recognizer, and this data represents a variety of information items regarding the performance of the recognizer. For example, in a preferred embodiment element 42 includes an internal representation of the waveform. By storing this internal representation, the system may playback the speech represented by the waveform. This element may also contain information concerning the acoustic characteristics of various spoken phrases and may also include thresholds used internally to choose candidates.

The recognizer state information element 44 contains state variables that insure that the same input to the system 10 provides the same output. In addition, for each dictation event the recognizer state information element 44 stores information describing the state of the recognition program. This information enables all values to be exactly reset and avoids causing the system to re-learn correct translations for speech events. The final element shown in the dictation event record is implementation-dependent information element 46. Element 46 stores many different data items, including, for example, data that allows the updating of vocabulary recognition data as a result of the way a speaker says words.

A dictation event and consequently a dictation event record 30 is created as part of the process of recognizing a word. The creation of a dictation event record includes the allocation or reservation of memory space in the dictation event database for the dictation event record which will store the information described above and shown in FIG. 9. The data record 30 is also initialized at the time it is created, and the system generates a dictation event handle 32 which uniquely specifies that dictation event record 30. Handle 32 is stored for each specific dictation event record by each facility within the recognizer or application which may later want to refer to a particular dictation event. Once the system creates a dictation event record 30 a dictation event can be selected as the active dictation event for any dictation event operation by specifying its dictation event handle. Alternatively, a dictation event can be selected by specifying another dictation event which stands in some relationship to the desired dictation event (such as chronologically following it) and specifying the relevant relationship. If no dictation event is currently active a "null dictation event" may be specified.

As described above, a candidate set is associated with each dictation event. From this set, the system chooses a best match candidate. Several operations can be performed on a dictation event record that relates to the candidate set of the detection event. In particular, a recognition candidate in the set can be marked as incorrect; a candidate can be marked as selected (i.e., can be specified by the user as a correct recognition for the speech event which the dictation event represents); candidates in the set can be reordered so that for any speech event a different candidate than the candidate originally determined by the system is produced as a best match candidate each time the speech event occurs. Finally, the entire candidate set can be retrieved for display to enable a user of the system to select the correct candidate or for further processing.

Another important operation performed on the dictation event database is the resetting of the state of the recognizer to the recognizer state at the time of the occurrence of a speech event. A common example of this resetting is the re-analysis of an utterance which was incorrectly recognized. It is the recognizer state information 44 stored in the dictation event record 30 that is used to perform the reset operation, and as discussed above this information includes state variables that enable the system to provide the same output for the same input.

The system of the present invention generally maintains the dictation event database only within a given dictation session and not between sessions. However, as users of the system will frequently interrupt a dictation session and continue at a later time either the entire dictation event database or individual dictation event records can be permanently stored in files for use either in analyzing the performance of the recognizer or for recreating the dictation session at a later time.

The system also allows dictation event records to be deleted from the dictation event database in order to minimize the amount of storage required for the dictation event database. Dictation event records may also be deleted in order to reduce the time required to perform other dictation event operations thereby reducing the searching time as well as the time associated with other operations. Typically, dictation events corresponding to the least recent speech events are removed first.

When the user, the recognizer or the application determines that the system correctly recognized a particular speech event or incorrectly recognized a speech event, a process of adapting the speech related data upon which the performance of the recognizer depends may be carried out. Information stored in the recognizer state information element 44 may be used in this process.

A chronological relationship exists between any two records of the dictation event database as one record was created before the other record. The speech event of the dictation event record that was created earlier occurred before the speech event of the dictation event which was created later. This chronological order can also be determined from the structure of the dictation event database. As described above the chronological relationship information element 34 generally will include a pointer to and from chronologically adjacent dictation event records.

After the system of the present invention processes a dictation event, a text event is then created. Referring to FIG. 5, each text event record 50 which is created and stored in the respective text event database is a formal data object which contains data describing an "input event". Such input events include the reception by an application of some input that can be treated as a single unit. One important class of input events are the reception of output from the recognizer and this output is generally in the form of translations. Other input events include typed input, input from pointing devices such as a mouse, etc.

For each input event, the application stores useful information in the respective text event database that includes a number of text event records 50. The application also provides techniques (commands, subroutine calls, macros, etc.) by which certain specified operations may be performed on the text event database. The term "text event" has been chosen to describe all application events whether or not the input events involve the processing or creation of text, and therefore text event records are also used to record information about all types of input events. A text event record 50 of a text event database is created as part of the process of accepting input to the application. The creation includes the allocation or reservation of memory space in the text event database for the record which will store the information comprising the text event. The creation also involves the initialization of that data record, and the generation of a text event handle 52 which can be subsequently used to uniquely specify that text event.

As in the case of the dictation event handle 32, the text event handle 52 generally represents a memory address of a particular text event in the text event database. This handle is stored for each application facility that may later want to reference that text event record, as the text event can be referenced be specifying its text event handle. Alternatively, a text event can be referenced by specifying another text event record which stands in some relationship to the desired text event (such as chronologically following) and specifying the relevant relationship.

Each text event record contains data describing the input event which resulted in the creation of the text event. The actual input data itself may be stored in the text event record, and a code number is stored in the text event record that identifies the input event type. This data is stored in the input event information element 62. Examples of typical types of input events are: reception of a translation from a recognizer; keyboard input; input from a pointing device; and "input" from a preprogrammed application activity.

Each text event record 50 also includes a data element that provides chronological relationship information with respect to other text event records. As in the case of the chronological relationship information element 34 in the dictation event records 30, the chronological relationship information element 54 in the text event records 50 includes links to and from text event records that were created immediately before and after each event record.

Unlike dictation events, text events can have hierarchical relationships with respect to each other. Each text event record 50 contains a hierarchical relationship information element 56 identifying those text events which are either immediately superior or immediately inferior to itself. This superior and inferior relationship is created if a given text event is active when a new text event is created. In such a situation, the active text event is considered to be the superior of the next created text event. For any text event record in a text event database, it is possible to determine all superior text events (if they exist) and all of its inferior text events (if they exist). Of course this order is only a partial ordering since not all text events stand in a hierarchical relationship to each other. The data stored in the hierarchical relationship information element 56 may be either a list of addresses of the superior and inferior text event records or links and pointers to appropriate lists of superior and inferior text events.

The text event record 50 also includes a data element that stores the textual relationship information so that actual text may be linked. In other words, any two consecutive items of text are identified as being consecutive so that the systems may jump around to different text events and still maintain the proper order of the outputting text. This textual relationship information element 58 of each text event record is generally a pointer to and from each text event record which indicates the relative textual position of any two text events that have text associated with them. This feature is especially important in a word processing program where text is added to a target document. In such a situation, for any two text events which result in such addition of text to the same document an ordering can be determined which specifies which text event corresponds to text closer to the beginning of the document and which text corresponds to text closer to the end of the document. This, of course, is only a partial ordering since not all text events are associated with text in the same document.

Each text event record also contains an input event information element 62 describing the input which resulted in the creation of the text event. The actual input data itself may be stored in the text event record or a code number may be used and stored in the text event record that identifies the input event type. Examples of types of input events are: reception of a translation from the recognizer; keyboard input; input from a pointing device such as a mouse; and input from a preprogrammed application activity.

Each text event record 50 may be linked to a dictation event through an associated dictation event handle 60 that is stored for those text events that are created as the result of a translation generated by the recognizer reacting to a speech event. All translations are accompanied by the dictation event handle of the dictation event which describes that speech event. This data element enables the system, at a subsequent point in time, to retrieve a dictation event handle and instruct the recognizer to perform a dictation event operation such as resetting the recognizer state.

The text event record 50 also includes an application state information element 64 that describes the relevant application system state at the time that the input event occurred. With this information it is possible, at a later time, to reset the application to its state at the time the input event occurred. Typical types of state information include the beginning and ending position of text in documents (for word processing applications), cursor positions, internal application mode information, etc.

Finally, each text event record 50 includes an implementation-dependent information element 66. An example of an implementation-dependent application is a provision allowing text to be highlighted. In this situation, element 66 will include data indicating whether the text of the text event should be highlighted.

The dividing up of the processing of speech events into dictation events and text events enables the system of the present invention to enhance the voice control of application programs. The utility of these data objects includes the effective deletion of text from incorrectly recognized words; the backtracking of the application (and the underlying recognizer) at the option of the user; the correction of recognition errors by voice; the organization of documents in word and phrase-level fields; the entry of data in structured reports by voice; the adaptation of recognizer performance to a particular speaker's voice by learning which words the speaker uses and how those words are pronounced; the effective communication of modules within the recognizer; and the post-hoc analysis of the recognizer performance.

Figure 6A:
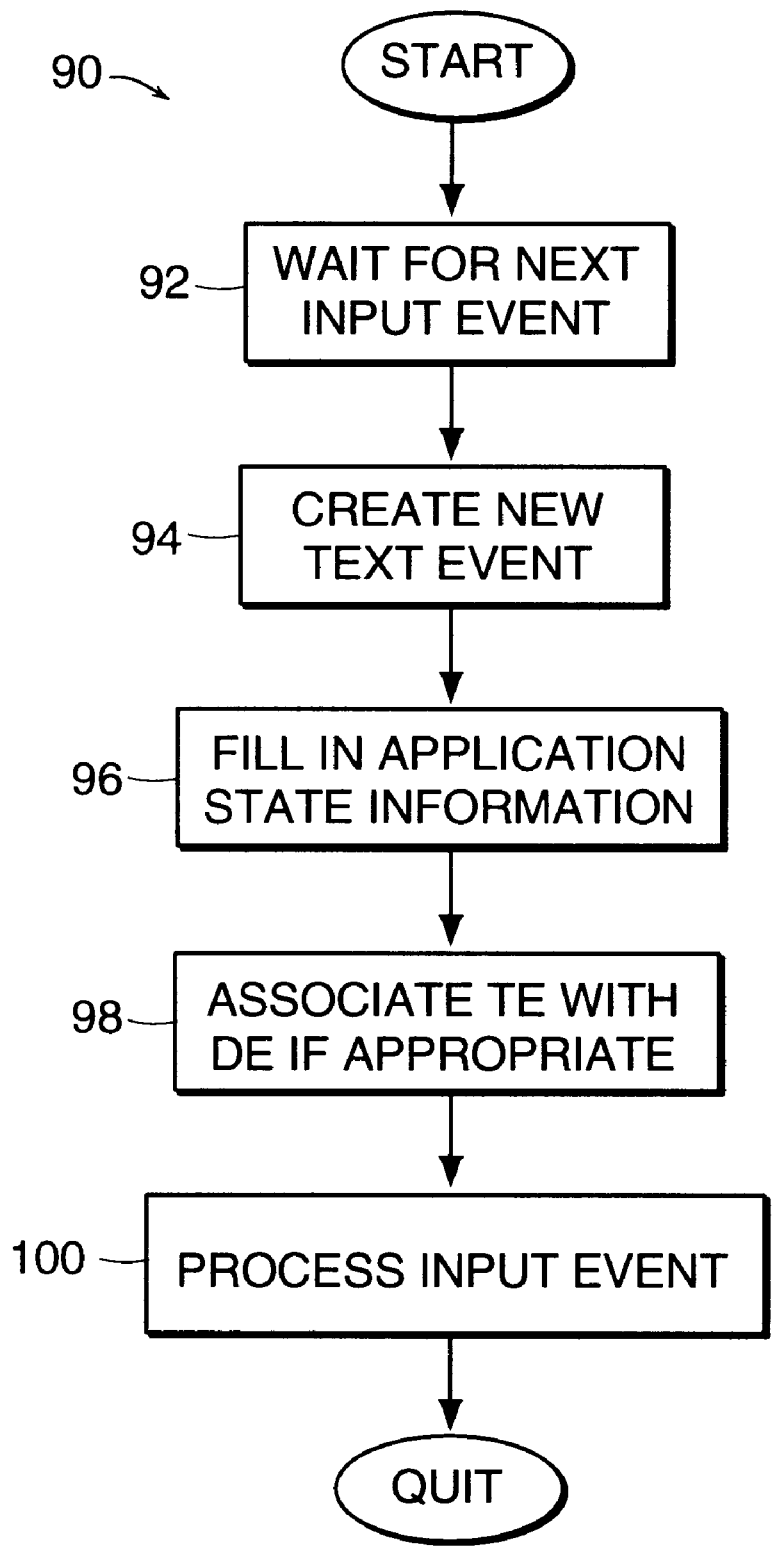
FIG. 6a is a flow chart of the operation of the system and method of the present invention in processing speech events.
Figure 6B:
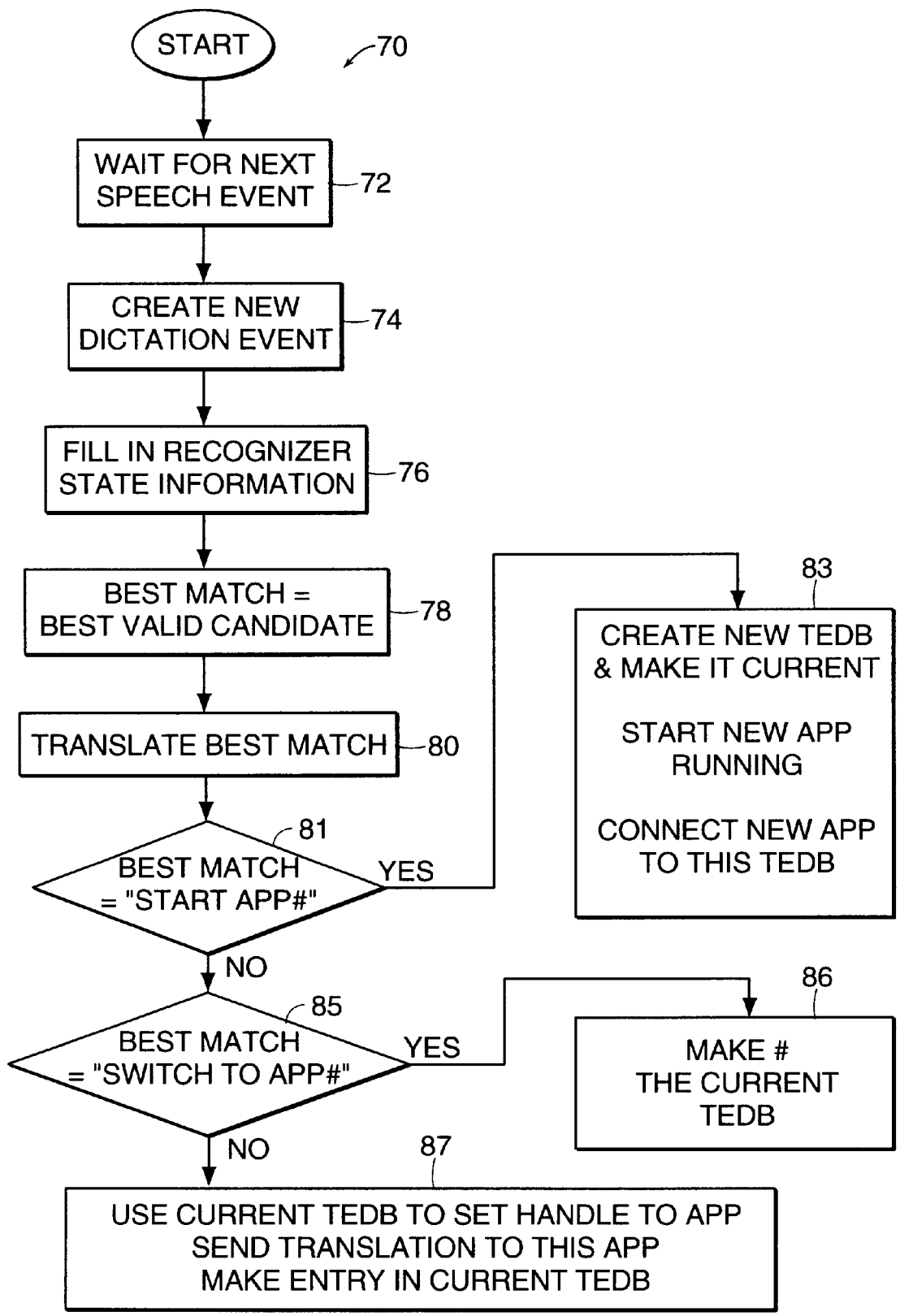
FIG. 6b is a flow chart of the operation of the system and method of the present invention in processing input events.

As shown in FIG. 6a, operation of the system begins with the waiting for a speech event to occur in step 72. Once a speech event is input to the system through the microphone 18, the system initiates a new dictation event by creating a dictation event record in the dictation event database in step 74. At this time, recognizer state information is inserted in the appropriate locations in the created dictation event record in step 76, and in step 78 the best match is determined as being the valid candidate with the highest recognition probability score. Once the correct choice has been made, the system in step 80 will translate the best match into the appropriate text.

As indicated at block 81, the system tests the translated best match to determine if it is a command, e.g. "START APPLICATION X" which should initiate the running of a new or additional user application. If it is such a command, the system, as indicated at block 83, creates a new text event database corresponding to the new user application program and identifies it as the current database, i.e. the database in which subsequently generated text event records will be stored. The system also transmits corresponding commands to the DesqView multi-tasking program to effect allocation of an appropriate section of memory and an appropriate portion of processor time to the newly started user application and to initiate the actual running of the new user application program as one of the multi-tasked programs running effectively simultaneously. As is understood by those skilled in the art, this command sequence may be stored in a DesqView program information (or "PIF") file.

As indicated at block 85, the system also tests the translated best match to determine if it is a command, e.g. "SWITCH TO APPLICATION X" which should cause further user input to go to another one of a group of already running user application programs. If it is such a command, the system makes the corresponding text event database the current database as indicated at block 86.

If the current application is not being changed, the system, as indicated at block 87, uses the current text event database to set the handle to that user application program; sends translations to that user application program; and makes corresponding record entries into that current text event database.

The source code for the computer program components which effect the creation of multiple text event databases and which interact with the DesqView multi-tasking system is included in the program listing which is provided in the Microfiche Appendix.

Prior to the translation being actually delivered to the respective user application by the text event subsystem 55, the text event subsystem waits for a next input event to occur. When this input event occurs (such as when a translation is sent from the dictation event subsystem 18 to the text event subsystem 20) the system in step 94 creates the new text event record 50, and following this creation of the new record, inserts the proper chronological relationship information in element 54, the hierarchical relationship information in element 56, the textual relationship information in element 58 and the application state information in element 64. In step 98, the text event record 50 is associated with its dictation event record 30 if such association is appropriate. Finally, the input event is processed in step 100 by the text event subsystem by the forwarding of the translation to the user application. At this point, the processing of the speech event as dictation and text events is concluded.

As discussed above, a principal feature of the present invention is the ability of the system to effectively control and modify system operation through verbal commands that allow the user to refer directly to earlier events in the dictation process for the respective user application. In a preferred embodiment, the system includes several such spoken commands, and a description of the more important of these commands is provided below.

"SCRATCH THAT"—The phrase "SCRATCH THAT" is identified by the recognizer as a special phrase. The intent of the phrase is to cause the effect of the previous voice command to be undone (specifically, in word processing situations, to cause the text entered as a result of the previous speech event to be removed from the document). In a preferred embodiment, the previously active dictation event is examined to determine the number of characters in the translation that were sent to the application. The identical number of rubout characters is then transmitted to the application, and the recognizer state is reset to its value at the time the previous speech event occurred. In other embodiments a command may be transmitted to the application, instructing the application to remove from the document the text associated with the previous text event. In order to erase several words or phrases the voice command is simply repeated.

Figure 7:
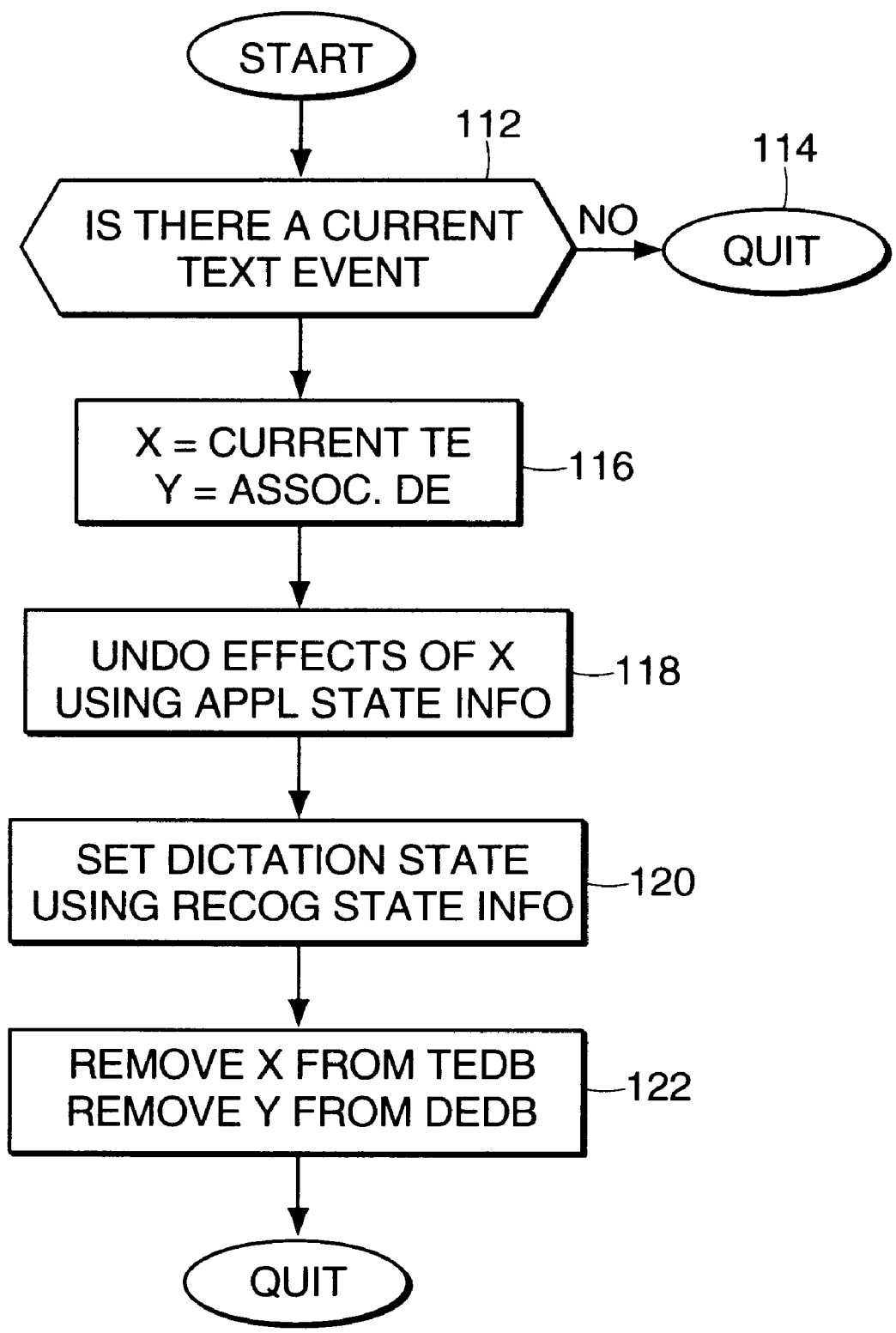
FIG. 7 is a flow chart of the operation of the system and method of the present invention in response to a "SCRATCH THAT" command.

Referring to FIG. 7, in response to a "SCRATCH THAT" command, the system determines whether there is an active text event. If there is no active text event, then there is no input to be erased, and the system ceases processing of the "SCRATCH THAT" command. If there is a current text event the associated dictation event record is retrieved and the system removes the effects of the current text event in step 118 by using the information stored in the application state information element 64. For example, a word processing application will move the cursor position back to its position prior to the active text event and will recognize that the translated text is not valid and should be removed. The dictation state must also be corrected and the system in step 120 resets the dictation state to its state prior to the speech event using the information stored in the recognizer state information element 44. The final step 122 in the "SCRATCH THAT" command is to remove the current text event record from the text event database and the associated dictation event record from the dictation event database.

Figure 8:
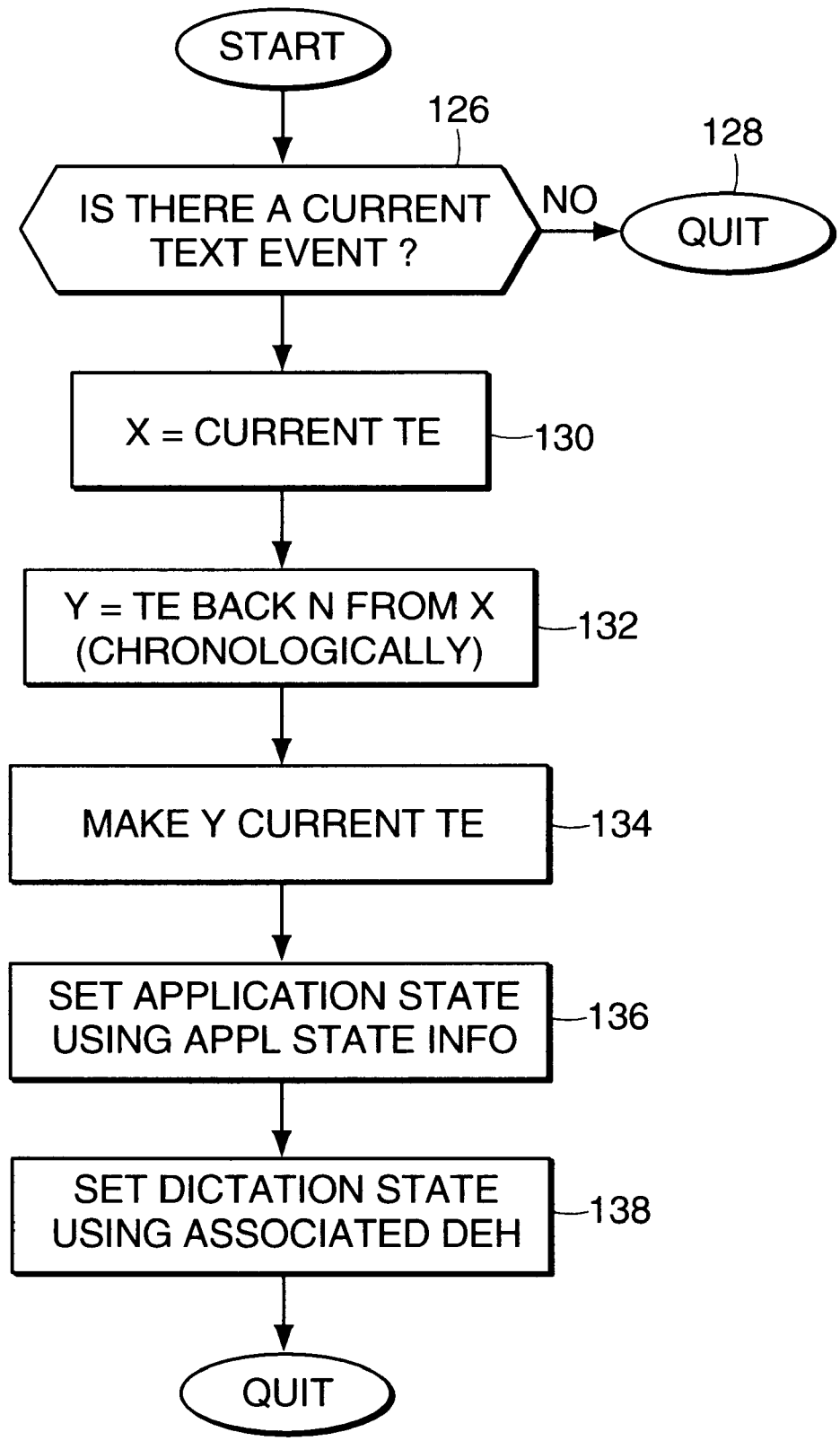
FIG. 8 is a flow chart of the operation of the system and method of the present invention in response to a "FORWARD N" command.

"FORWARD N"—Referring to FIG. 8, the "FORWARD N" command causes the data entry position of the application to be moved forward to a position "N" text events from its current position. Again before processing this command, the system determines in step 126 whether there is a currently active text event. If an active text event exists the system in step 130 retrieves the text event record for the active text event. The system, in step 132, then retrieves the text event record of the text event which is chronologically positioned "N" positions after the active text event. This text event is then made the active text event in step 134 and the application state information element 64 is then corrected to reflect this change. Using the associated dictation event handle 60, in step 138 the dictation state is also updated in recognizer state information element 44.

"BACK N"—The phrases "BACK TWO", "BACK THREE", etc., are identified by the recognizer as special phrases. The intent of these phrases is to cause a data entry position of the application—typically called the cursor position) to move to where it was "N" speech events ago. Note that this command is different from the "SCRATCH-THAT" command in that the effects of the latest speech events are not erased, although the cursor position is changed, and the application and recognizer context that existed previously are reestablished.

Figure 9:
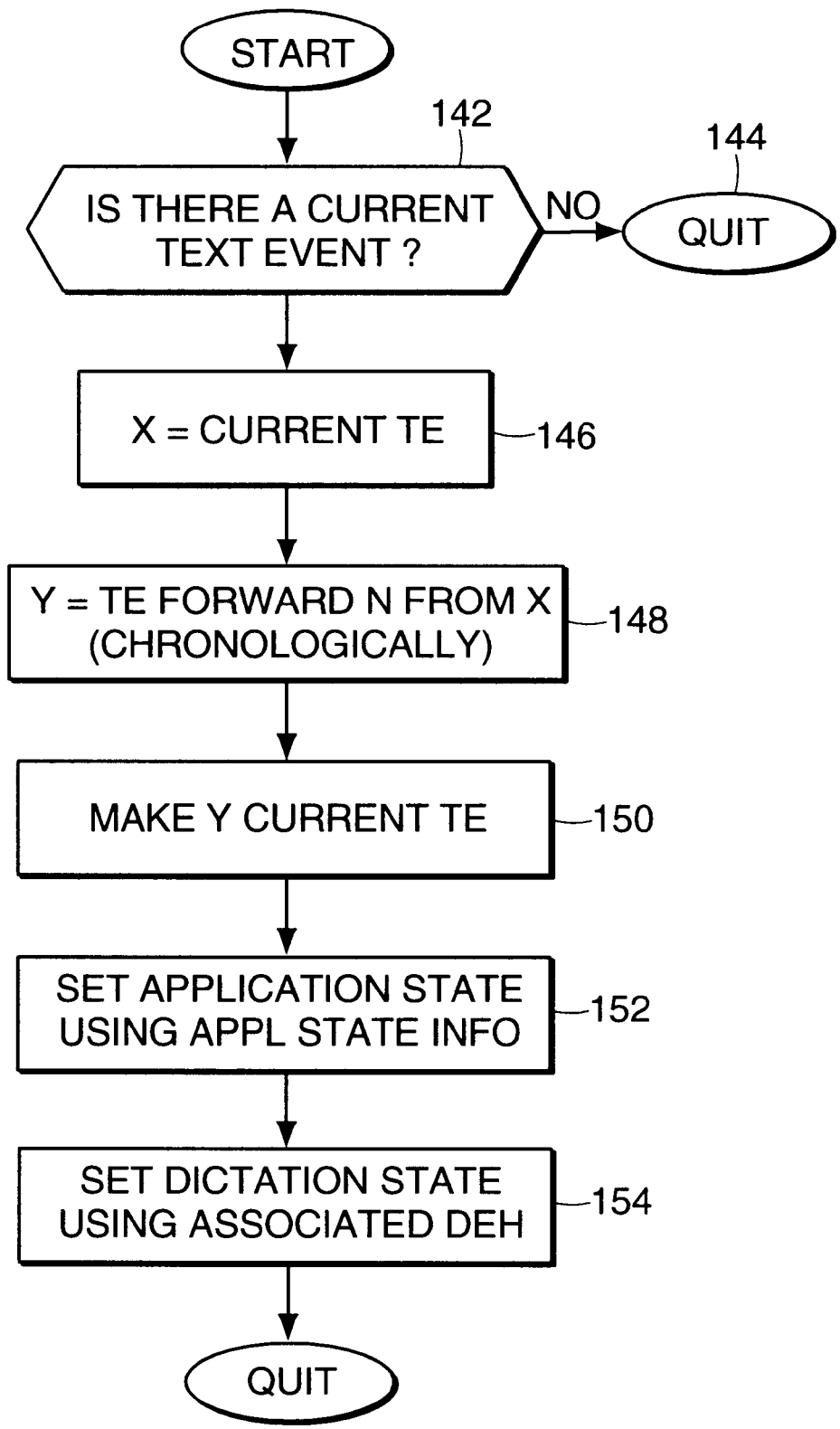
FIG. 9 is a flow chart of the operation of the system and method of the present invention in response to a "BACK N" command.

Initially upon receiving the "BACK N" command, the system as shown in FIG. 9 determines in step 142 whether there is a current text event, and if a current text event exists the system fetches the text event record of the current text event in step 146. The text event record that is chronologically positioned "N" places before the active text event record is also fetched in step 148. The system then marks the text event record which was located "N" positions back from the active text record as the new active record in step 150. Then, in step 152 the application state is reset through the information stored in the application state element 64, and the state of the dictation event is changed by accessing the associated dictation event record by using the associated dictation event handle 60. At no time during the operation of this command is data removed from the dictation event data base or the text event data base.

"BACKTRACKING"—There are many situations in which it is desirable to "undo" one or more voice commands. To effectively accomplish this task, both the recognizer and the application must be reset to a previous state, and selected data which has been entered into the recognizer or application database (such as text in documents being created by a word processing application) must be removed. In general, such goals are accomplished by specifying which dictation events are to be backtracked through. Sufficient information is stored in each dictation event record to identify which recognizer state variables were changed, what their previous values were, and which recognizer databases were changed and in what way. Since chronological relationships exist between dictation event records in the dictation event database, dictation event records can be selected in the proper sequence to undo all changes from the present moment back to the last dictation event to be backtracked through. Also, since text events are tied to dictation events and a chronological order exists among all text events, a similar backtracking procedure can be accomplished for the application.

Figure 10:
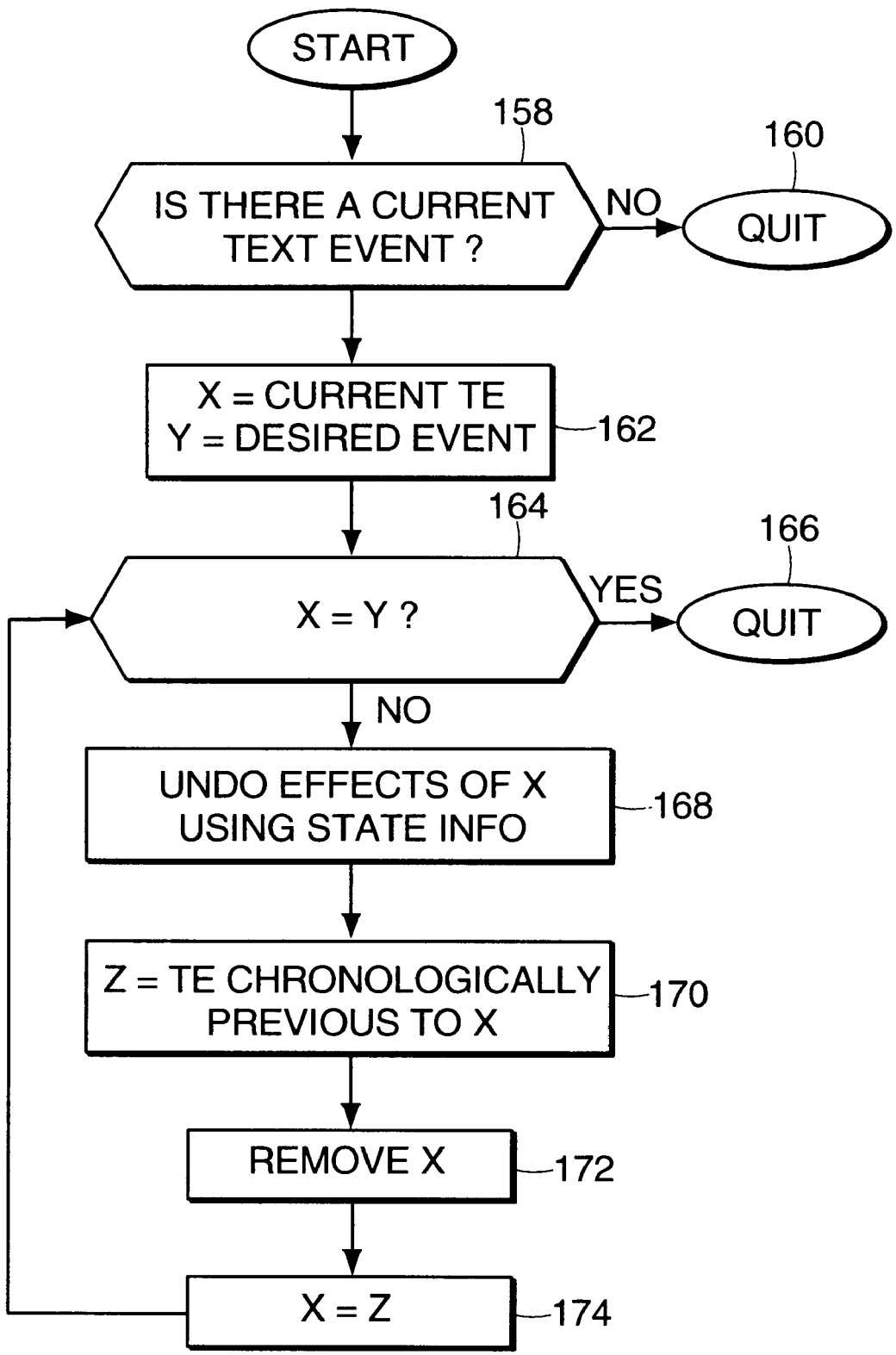
FIG. 10 is a flow chart of the operation of the system and method of the present invention in response to a "BACKTRACK" command.

Referring to FIG. 10, upon receiving a "BACKTRACK" command, the system determines whether there is a current text event in step 158. If there is an active text event, the active text event record is fetched, and in step 164 the system determines whether the active text event is the desired event, and if they are the same, the system returns to normal operation in step 166. If the comparison performed in step 164 reveals that the active text event and the desired text event are not the same, the system will fetch the state information stored in the application state information element 64 of the active text event record and undo the effects of the active text event. The system then fetches the text event record of the text event chronologically previous to the active text event in step 170, and the previously active record is removed from the text event database in step 172. The text event that was chronologically prior to the now deleted text event record is then compared again in step 164 to the desired event. The system continues to go through this loop until the current text event record is the desired text event.

"FILL IN FORM"—An important use of speech recognition is in the generation of structured reports, which include frame material (e.g., "name: ") surrounding fields to be filled in. Dictation and text events can be used to allow such forms to be invoked by voice; individual fields selected; data entered into those fields; corrections made, etc. These techniques may be implemented using the hierarchical characteristics of the text events.

In implementing a "FILL IN FORM" command a single text event is associated with the entire form. Inferior text events are then associated with each field in the form and the textual relationship characteristics of these texts events are used to specify which text event records are associated with which logical field. The application dependent information elements in the text event record associate locations in the document text with logical fields. Fields can be filled in, erased and corrected using the other commands described herein.

Figure 11:
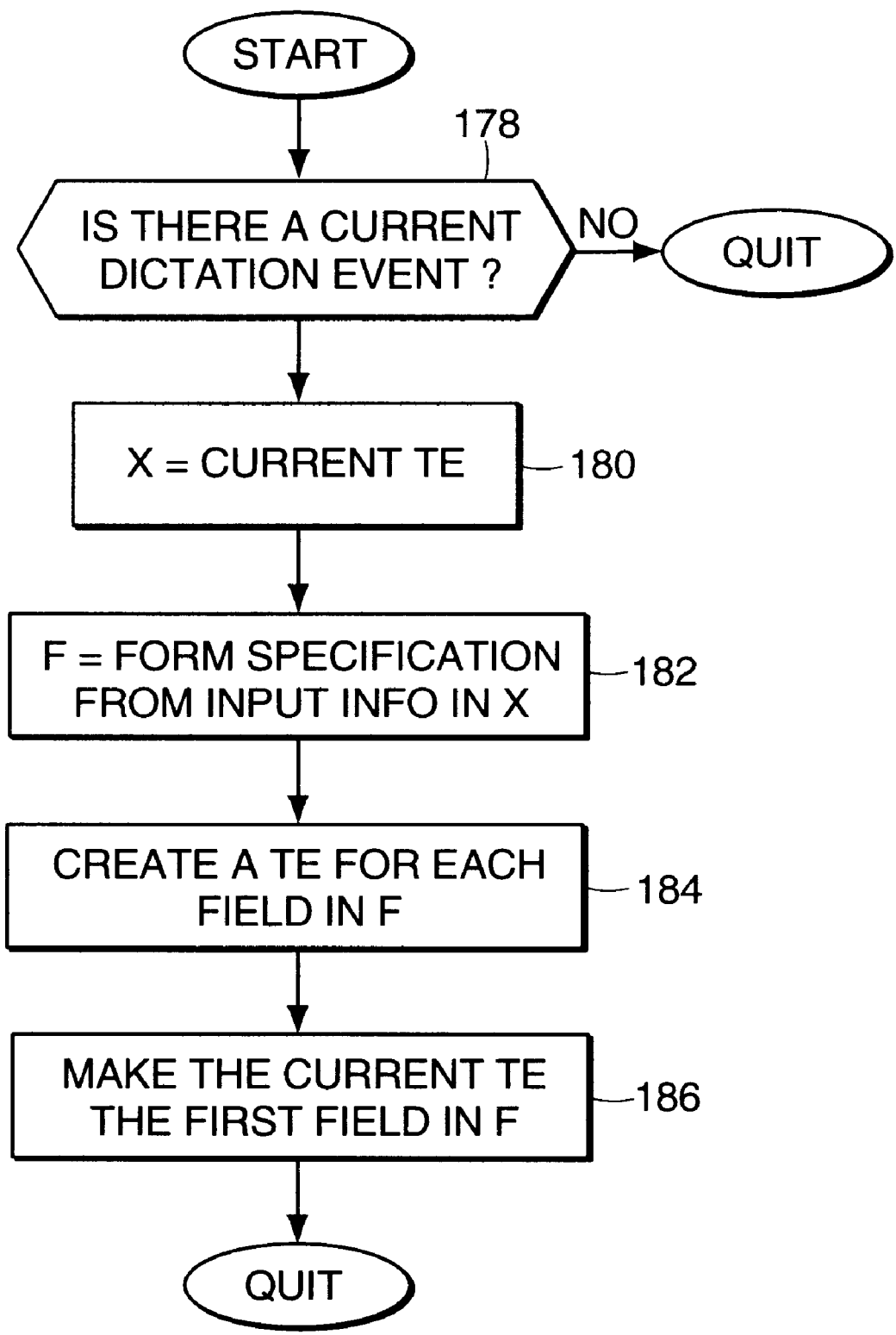
FIG. 11 is a flow chart of the operation of the system and method of the present invention in response to a "FILL IN FORM" command.

Referring to FIG. 11, after the system determines that there is an active dictation event in step 178, the system fetches the text event record associated with the active text event and the form corresponding to the active text event is pulled up from the input event information element 62 in step 182. The system then creates a text event record for each field in the form, and the system assigns the current text event as the first field in the form. The form is then filled in using other commands or by issuing other voice text input. As each field is filled in, the system progresses through the form to the next field until all the fields in the form have been filled in.

"NEXT CHOICE"—A phrase "NEXT CHOICE" is identified by the recognizer as a special phrase, the intent of which is to cause the effect of the previous voice command to be undone (as with the "SCRATCH THAT" command), and to substitute for the previous best matched recognition candidate, the recognition candidate with the next highest recognition score. In a preferred embodiment the actions taken in response to a "NEXT CHOICE" command are identical to those that would be taken if the "SCRATCH THAT" command were recognized. The best matched recognition candidate is then marked as invalid, and the remaining valid candidate with the highest score is then designated the best match and its translation is sent to the application. Note that the "NEXT CHOICE" command may be issued repeatedly for the same speech event. As the operation of this command is identical to a "TAKE TWO" command, its operation will be described below with respect to the "TAKE N" command.

TAKE N"—The phrases "TAKE TWO", "TAKE THREE", etc. are identified by the recognizer as special phrases. The intent of these phrases is to cause the effect of the previous voice command to be undone and to substitute for the previous best matched candidate a recognition candidate of position N in an "alternate list" which is displayed as a full or partial candidate list on a user's screen. The operation of this command is identical to the operation of the command "NEXT CHOICE", except the new best match recognition candidate is specified by the number "N" and by the order of candidates in the alternates lists.

Figure 12:
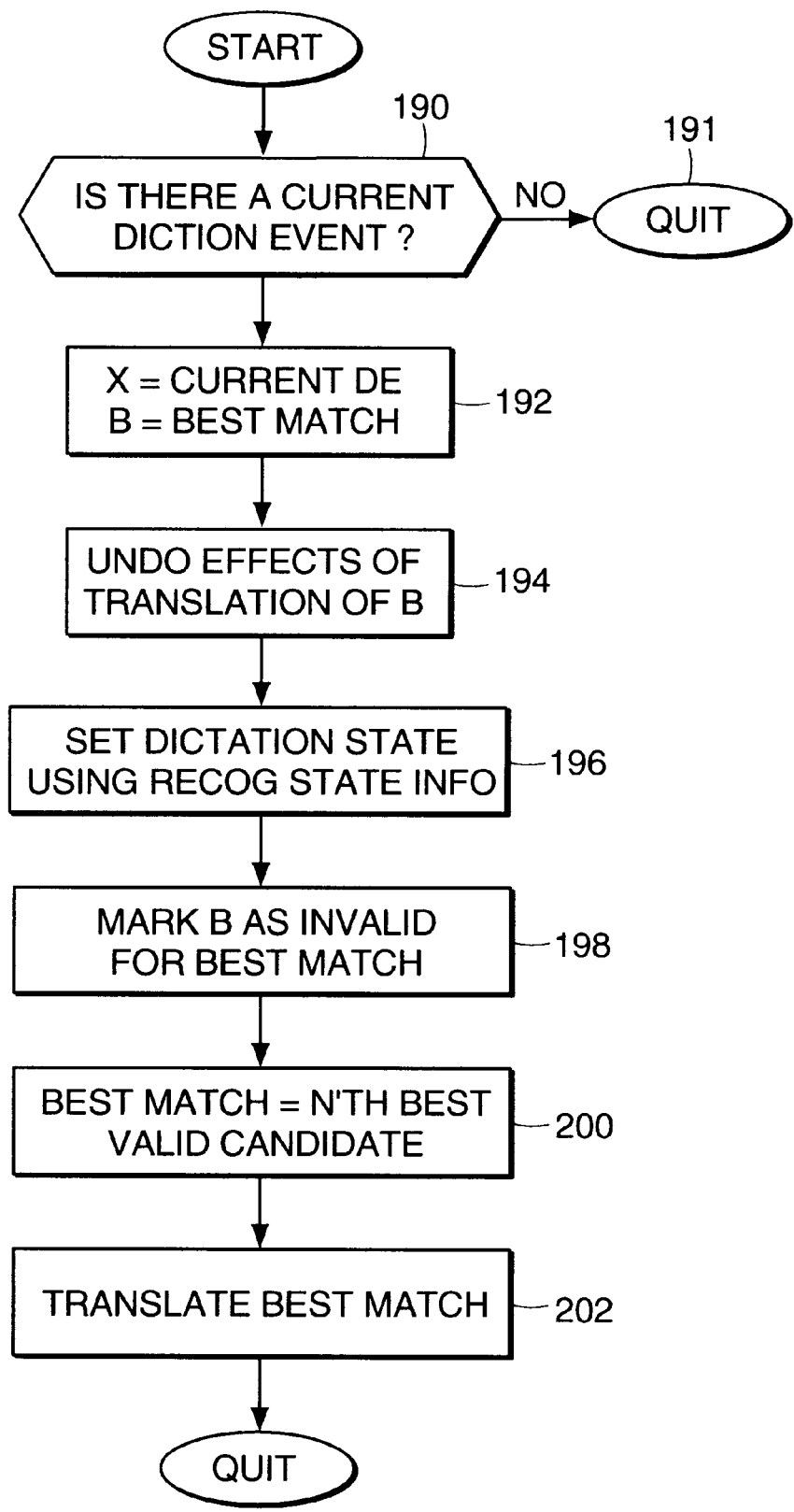
FIG. 12 is a flow chart of the operation of the system and method of the present inventionn in response to a "TAKE N" command.

As shown in FIG. 12, upon receiving a "TAKE N" command, the system determines the current dictation event and the best matched candidate for that dictation event. In step 194, the effects of the translation of the best match are undone and in step 196 the system resets the dictation state using the recognizer state information element 44. In the candidates set, the original best match candidate is marked as invalid so that it will not be chosen as best match again for the particular speech event, and in step 200 the system assigns the Nth candidate in the displayed candidate list as the best match. The new best match is then translated in step 202, and the system is then ready to process a new speech event.

"TRY AGAIN"—The phrase "TRY AGAIN" is identified by the recognizer as a special phrase. The intent of the phrase is to cause the effect of the previous voice command to be undone, as with the "SCRATCH THAT" command, and to prepare the recognizer to process another speech event, but in no case to allow the previous best matched candidate to be chosen as best match again. In a preferred embodiment actions are taken identical to those taken in response to a "SCRATCH THAT" command. The best matched recognition candidate is then marked as invalid and another speech event is processed. After a candidates list is prepared, all invalid candidates from the previous dictation event are marked invalid on the new list. The best matched candidate is then chosen from the remaining valid candidates in the new list.

Figure 13:
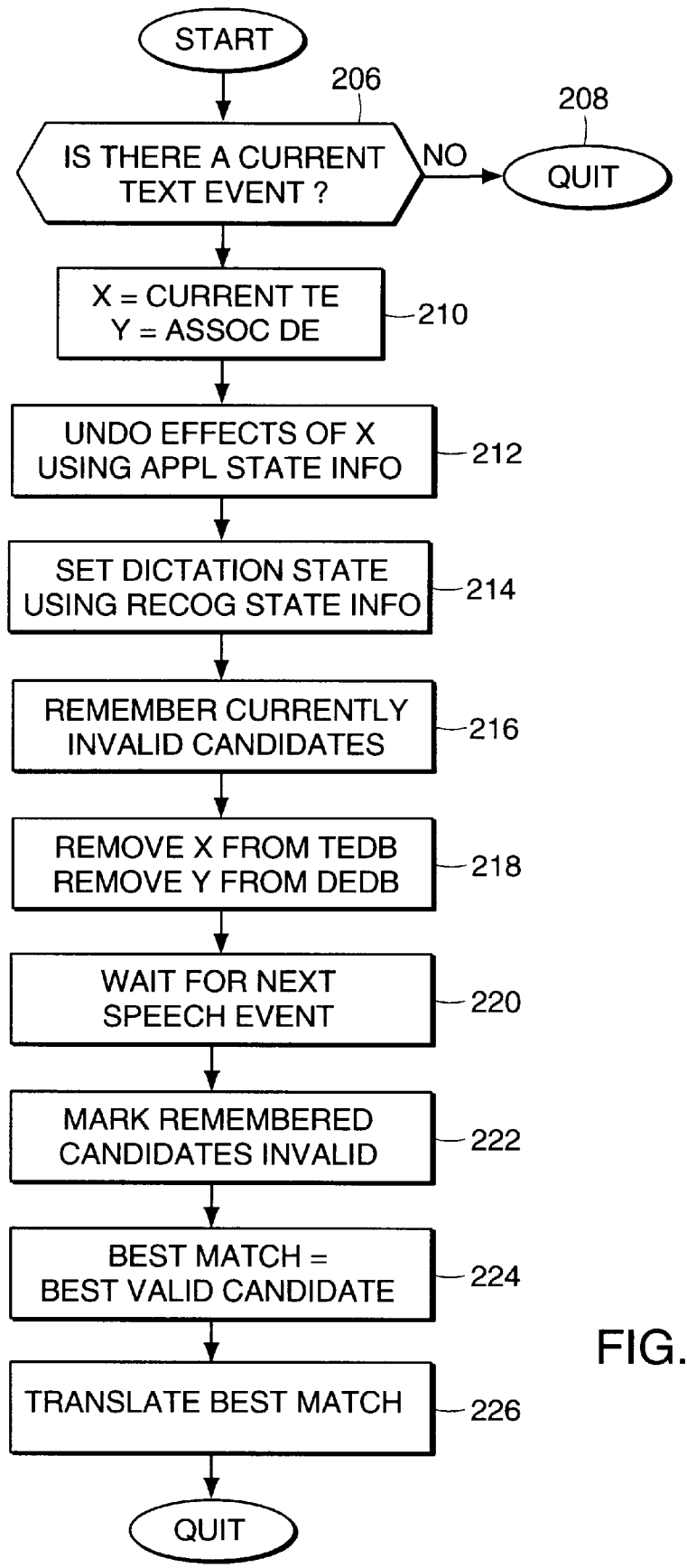
FIG. 13 is a flow chart of the operation of the system and method of the present invention in response to a "TRY AGAIN" command.

Referring to FIG. 13, the system initially determines in step 206 whether there is an active text event, and if there is an active text event, the associated dictation event record of the active text event is fetched in step 210. The system then removes the effects of the current text event in step 212 by using the information stored in the application state information element 64. The dictation state is reset using the recognition state information in element 44 in step 214, and the system notes all current invalid candidates in step 216. At that point, the system removes the active text event from the text event database and removes the associated dictation event record from the dictation database. The system then waits for the next speech event in step 220 which is the reissuing of the speech event which resulted in the incorrect translation. The invalid candidates are marked as invalid in step 222, and in step 224 the system assigns the valid candidate having the highest recognition score as the best match. This best matched candidate is then translated and sent on to the application.

Use of dictation and text events enhance the voice control of application programs as described above. A number of these commands use different variations of the backtracking capabilities that are made possible by the dictation and the text event records to implement concise and powerful user commands for undoing the effects of incorrectly recognized speech events. The commands described above that fall into this category are the "SCRATCH THAT", "NEXT CHOICE", "TAKE N", "TRY AGAIN" commands.

Many applications for which speech control is appropriate include the creation of documents of some sort. Word processing, database and spreadsheet programs are important examples. The use of dictation and text events imposes an important level of organization on the text in such documents, an organization in which the document is segmented into the speech events which created it. Boundary positions between text created by one speech event and text created by another can be reached efficiently using voice commands. Examples of these commands are the "BACK N", "FORWARD N" and "FORMS FILL IN" commands.

Further, in order for these useful commands to correctly utilize the sequential and hierarchical facilities of the dictation event and text event databases, it is important that respective databases be created and maintained for the different user application programs running essentially simultaneously under the multi-tasking operating system employed by the present invention.

In view of the foregoing it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. A computer readable storage medium encoded with instructions, which when loaded into a digital computer utilizing a multi-tasking operating system that allows a plurality of user application processes to run simultaneously, establishes a speech recognition system, the system comprising:

a speech recognizer running as one of the user application processes, the recognizer providing a recognition output responsive to a speech input, the recognizer further including:
   a. an application process selector that directs the recognition output to a designated one of the other user application processes;

b. a recognition history database manager:
  i. that creates a recognition history database for each of the other user application processes then running, and
  ii. that stores in the recognition history database for each respective other user application process, data constituting a history of the recognition output sent to such other user application process; and
c. undo implementation means, responsive to a spoken user command, for undoing the effect of a previous recognition output provided to a user application receiving such previous recognition result, the undo implementation means utilizing data in the corresponding recognition history database.

2. A computer readable storage medium according to claim 1, wherein the data stored in the recognition history database for each respective use application process includes, with respect to any given recognizer output therein stored, a set of possible recognition output alternatives, and wherein the speech recognizer further includes a recognition correction means, responsive to a spoken user command, for directing a selected recognition output alternative from a recognition history database to the corresponding user application process.

3. A computer readable storage medium according to claim 1, wherein the speech recognizer further includes a set of recognition comparison models associated with each respective other user application process.

4. A method of operating a speech recognizer that allows a plurality of user application processes to run simultaneously in a multi-tasking computer operating system, the recognizer running as one of the user application processes and providing a recognition output responsive to a speech input, the method comprising:

a designating one of the other user application process to receive the recognition output;

b. establishing dynamically a recognition history database for each of the other user application processes then running, and storing dynamically, in each such recognition history database, data constituting a history of the recognition output sent to such other user application process; and c. utilizing data in the corresponding recognition history database, in response to a spoken user command, to undo the effect of a previous recognition output provided to a user application receiving such previous recognition result.

5. A method according to claim 4, wherein the data stored in the recognition history database for each respective user application process includes with respect to any given recognizer output herein stored, a set of possible recognition output alternatives, and wherein the method further includes directing, in response to a spoken user command, a selected recognition output alternative from a recognition history database to the corresponding user application process.

6. A method according to claim 4, wherein the method further includes associating a set of recognition comparison models with each respective other user application process.

* * * * *